US006532553B1

(12) United States Patent
Gwilt et al.

(10) Patent No.: US 6,532,553 B1
(45) Date of Patent: Mar. 11, 2003

(54) DEBUGGING DATA PROCESSING SYSTEMS

(75) Inventors: David John Gwilt, Waterbeach (GB); Andrew Christopher Rose, Cherry Hinton (GB); Peter Guy Middleton, Saffron Walden (GB); David Michael Bull, Balsham (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 09/407,846

(22) Filed: Sep. 29, 1999

(30) Foreign Application Priority Data

Dec. 8, 1998 (GB) .............................................. 9826972
Feb. 8, 1999 (GB) .............................................. 9902759

(51) Int. Cl.[7] ................................................ H02H 3/05
(52) U.S. Cl. ........................... 714/38; 711/206; 712/42
(58) Field of Search ............................... 714/38, 25, 37, 714/45, 734; 712/223, 225, 227, 300, 42; 711/206; 710/22

(56) References Cited

U.S. PATENT DOCUMENTS 5,530,804 A * 6/1996 Edgington et al. ............. 703/28
5,542,033 A * 7/1996 Dao-Trong et al. ............ 714/10
5,588,118 A * 12/1996 Mandava et al. ............. 712/208
6,026,478 A * 2/2000 Dowling ...................... 712/215
6,321,329 B1 * 11/2001 Jaggar et al. ................ 712/227

FOREIGN PATENT DOCUMENTS

EP            0 343 992           11/1989

* cited by examiner

Primary Examiner—Robert Beausoliel
Assistant Examiner—Rita A Ziemer
(74) Attorney, Agent, or Firm—Nixon & Vanderhye P.C.

(57) ABSTRACT

A data processing system is provided having a main processor 4 and a coprocessor 26. When in a debug mode, the main processor 4 and the coprocessor 26 are supplied with different instructions. The coprocessor 26 is supplied with a coprocessor debug data generation instruction (MCR) whilst the main processor 4 is supplied with a main processor data capture instruction (LDR). The coprocessor 26 responds to the MCR instruction by controlling debug data representing state of the data processing apparatus 2 to be placed upon a data bus 24 from where it is read by the main processor 4 under control of the LDR instruction.

24 Claims, 2 Drawing Sheets

DEBUGGING DATA PROCESSING SYSTEMS

BACKGROUND OF THE INVENTION

1. Field of the Invention

This invention relates to the field of data processing systems. More particularly, this invention relates to debugging data processing systems.

2. Description of the Prior Art

With the advent of increasingly complex data processing systems, and the requirement for shorter development time, it is becoming increasingly important to provide powerful debugging tools to assist in system development. This is particularly the case in deeply embedded systems in which much of the systems state is normally inaccessible.

One way of dealing with the debugging problem is to provide serial scan chains around portions of the circuits of the system to allow input signals to be scanned in and applied to the circuit and output signals to be captured and scanned out of the circuit. This is the JTAG type of debugging scheme.

A problem with the serial scan chain approach to debugging is that the scan chain cells may need to be placed upon critical signal paths within the system slowing the signal paths and limiting the system performance. It is an object of the invention to address the above problems

SUMMERY OF THE INVENTION

Viewed from one aspect the present invention provides data processing apparatus responsive to a sequence of processor instructions containing main processor instructions and coprocessor instructions, said data processing apparatus comprising:

(i) a main processor for executing main processor instructions appearing within said sequence of processor instructions;

(ii) a coprocessor coupled to said main processor for executing coprocessor instructions appearing within said sequence of processor instructions; and (iii) an instruction insertion mechanism operative in a debugging mode for supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor.

In a system having both a coprocessor and a main processor, these different elements may be controlled to cooperate while in a debug mode to recover system state information that would otherwise be difficult to obtain without a disadvantageously extensive use of scan chains. More particularly, whilst the same instruction stream is normally fed to both the main processor and the coprocessor, the invention provides that different instructions may be fed to the main processor and the coprocessor in the debug mode with the main processor being responsive to its instruction to capture debug data that is generated under control of the coprocessor in response to a coprocessor instruction executed at the same time (having been triggered to do so by execution of the main processor instruction).

The coprocessor instruction is decoded and interpreted by the coprocessor in the debug mode in a manner chosen by the system designer and is so potentially able to recover any particular items of system state that the system designer decides in advance and for which the circuitry is provided. The capture of the data by the main processor allows it to be subsequently recovered from the main processor via the normal output mechanisms of the system under control of normal main processor instructions.

In preferred embodiments the main processor data capture instruction transfers the debug data into a register of a register bank within the main processor. This data capture mechanism is both rapid and flexible.

The instruction insertion mechanism could take many forms. The mechanisms that feed the standard instructions to the main processor and the coprocessor when not in debug mode could be used to supply one of the main processor and the coprocessor with instructions during this debug mode with the other of the main processor and the coprocessor being supplied from an alternative source by mechanisms only operative in the debug mode. Alternatively, both the main processor and the coprocessor could be provided with special purpose mechanisms for supplying them with instructions during the debug mode. In this case, scan chains for scanning in instructions to the main processor and the coprocessor are preferred.

The state data generated in response to the coprocessor debug data generation instruction could be transferred to the main processor via a special purpose data path. However, in preferred embodiments the standard data bus that is employed in normal operation may also be employed in debug operation for this purpose.

In order to recover state data from the main processor in the context of a debug operation, a register store scan chain can be provided to capture data being read from a register of the main processor and serially clock that data out from the apparatus.

The above system can be used to recover many types of otherwise inaccessible state data from the data processing system. As an example, it is possible to use this approach to recover data from various peripheral devices if the system designer arranges for the coprocessor debug data generation instructions to be interpreted in that way. However, the invention is particularly well suited to the recovery of data from cache memories and memory management units. In particular, the invention can allow the TAG contents of the CAM and the data contents of the RAM of a cache memory and an MMU to be read relatively rapidly from the system and without impacting the normally critical signal paths between the cache, MMU and main processor by inserting scan chains to capture data values on these paths. The contents of a cache memory or an MMU are often highly significant elements of debug information required during system development.

In high performance systems, the main processor will typically have an instruction pipeline. In this case, the instruction insertion mechanism can comprise a scan chain for inserting an instruction into the fetch stage of this pipeline. In such embodiments the coprocessor typically has a pipeline follower and the coprocessor instructions can similarly be inserted into the fetch stage of this coprocessor pipeline.

In the context of a cache memory or an MMU, the problem of how a particular item of data is to be selected for recovery as debug data may be addressed by using the normal victim select circuitry that in standard operation controls which item is replaced when a new item needs to be inserted in the relevant one of the cache memory or the MMU. In the debug mode this victim selection circuitry can be set up in advance to operate to select a specific desired entry for recovery as the debug data.

Viewed from another aspect the present invention provides a data processing method controlled by a sequence of processor instructions containing main processor instructions and coprocessor instructions, said data processing method comprising the steps of:

(i) executing with a main processor main processor instructions appearing within said sequence of processor instructions;

(ii) executing with a coprocessor coprocessor instructions appearing within said sequence of processor instructions; and (iii) in a debugging mode, supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
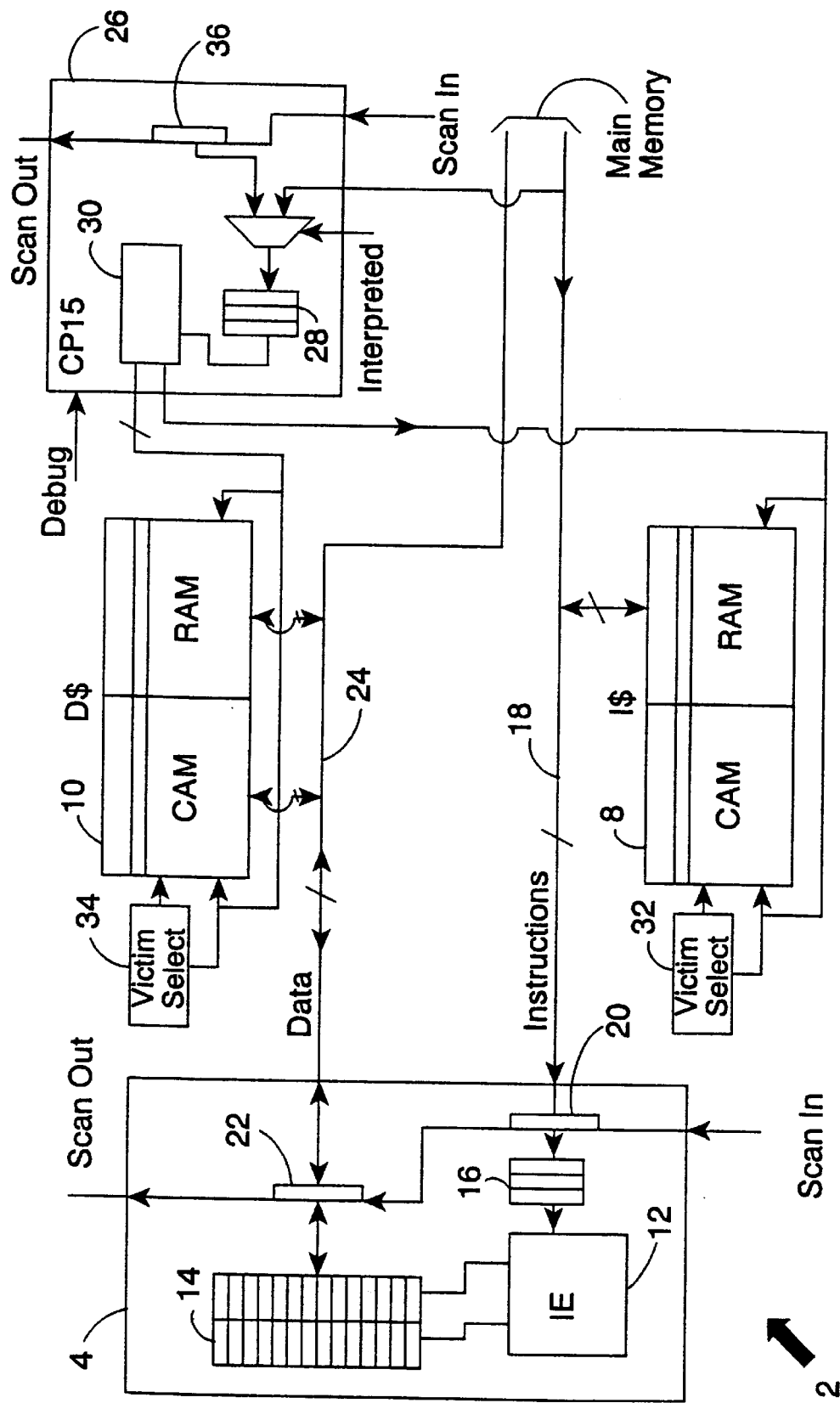
FIG. 1 schematically illustrates a data processing system according to one example embodiment of the present invention.

FIG. 1 shows a data processing system 2 comprising a main processor 4 and a coprocessor 26. An instruction cache 8 and a data cache 10 are provided for caching instructions and data respectively. A memory management unit may also be provided.

The main processor includes an instruction executer 12 and a register bank 14. A main processor pipeline 16 is responsive to main processor instructions read from the instruction bus 18 to feed these to the instruction executer 12 for execution. A main processor instruction scan chain 20 is provided on the instruction path for inserting instructions into the instruction pipeline 16 during debug operation. An output scan chain 22 is provided on the data path for capturing data values read out from the register bank 14 onto a data bus 24 during debug operation.

The coprocessor 26 designated as the special purpose coprocessor CP15 is provided for controlling debug operation as well as other system mode and control functions. A coprocessor instruction pipeline 28 is provided within the coprocessor 26 for following the instructions placed on the instruction bus 18 and fed to the main processor 4. When the coprocessor 26 detects a coprocessor instruction having its matching coprocessor number (i.e. 15) at the execute stage of the coprocessor instruction pipeline 28, then the coprocessor instruction decoder 30 responds to this coprocessor instruction in the manner predetermined by the system designer. In the present example, when in a debug mode, the coprocessor 26 can be made responsive to specific coprocessor instructions to control the data cache 10 or the instruction cache 8 to output either the contents of their CAM portion or their RAM portion onto the data bus 24. The respective victim selection circuitry 32, 34 can be configured in advance to point to a specific cache line that it is desired to be recovered onto the data bus 24. In a round robin mode of operation of the victim select circuitry a sequence of cache lines can be accessed.

At the same time that the coprocessor 26 is controlling the cache memory 8, 10 to place debug data onto the data bus 24, the main processor 4 can be reading that debug data into a register of the register bank 14. Once captured within the register bank 14, the debug data can be stored out in a subsequent processing cycle into the output scan chain 22 from where it can be recovered from the data processing apparatus 2.

The main processor instruction scan chain 20 and a coprocessor instruction scan chain 36 are used to together provide the instruction insertion mechanism. More particularly, an appropriate main processor data capture instruction can be inserted into the main processor pipeline 16 whilst a coprocessor debug data generation instruction can be inserted into the coprocessor instruction pipeline 28. When these respective instructions have advanced along to the execution stage of their pipeline, they will be executed to perform their respective roles. The advance of the main processor instruction to the execute stage triggers a similar advance of the coprocessor instruction such that the main processor instruction and coprocessor instruction are executed at effectively the same time.

It will be appreciated that the main processor pipeline 16 and the coprocessor pipeline 28 normally store the same instructions as they read these from the instruction bus 18 that they share. The present technique breaks this symmetry and causes different instructions to be presented to the coprocessor 26 and the main processor 4 such that they may cooperate together in a highly flexible manner to first trigger generation of the debug data and also the capture of this debug data.

Figure 2:
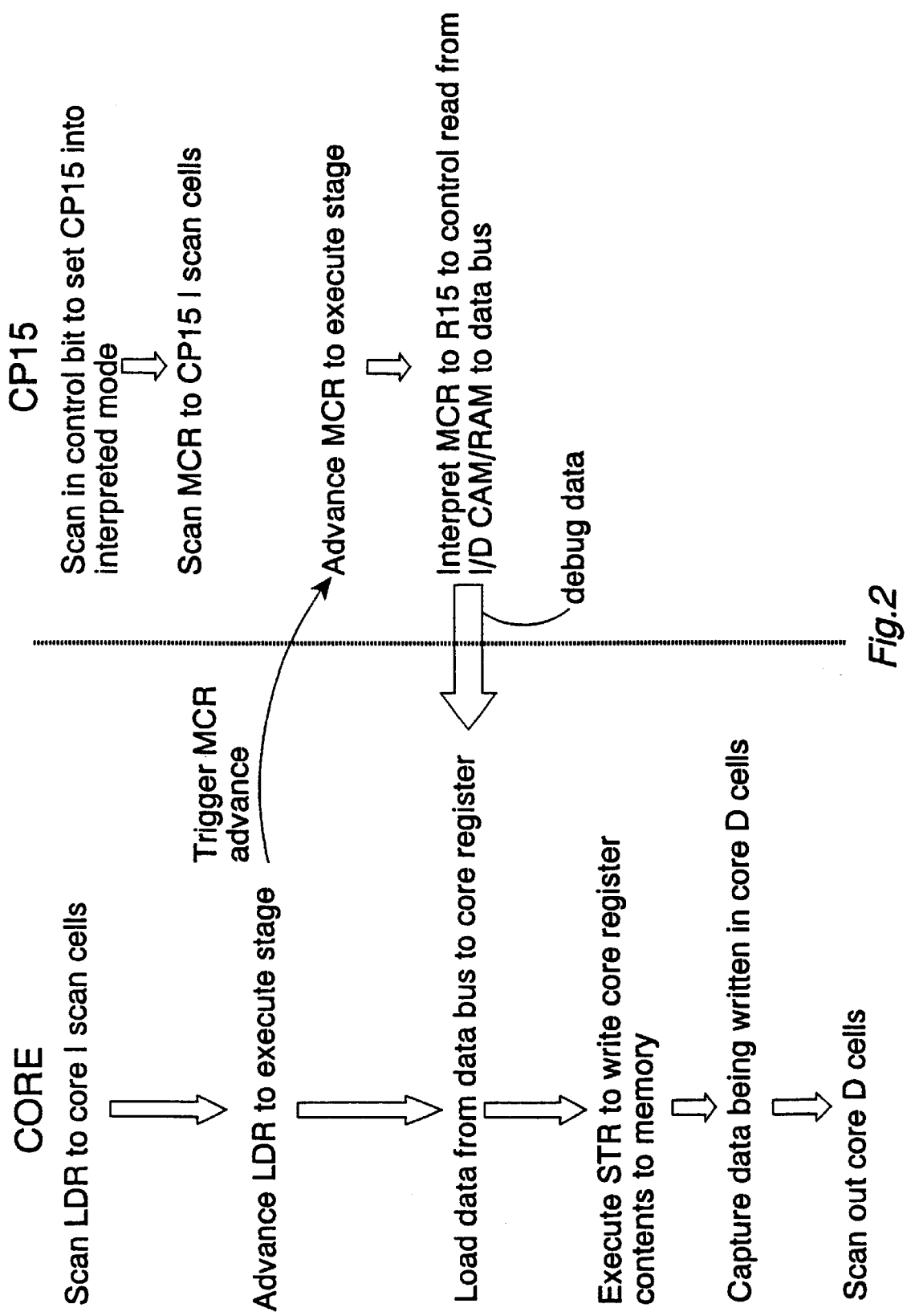
FIG. 2 schematically illustrates the operation of the main processor and the coprocessor during debug operation.

FIG. 2 schematically illustrates the different processing operations being performed in the main processor core 4 and the coprocessor 26 at different points in time. The first operations that occur are that the main processor data capture instruction (LDR) is scanned into the main processor instruction scan chain 20 whilst the interpreted mode control bit and the coprocessor debug data generation instruction (MCR) are scanned into the coprocessor instruction scan chain 36. The LDR and MCR instructions then advance in parallel down their respective pipelines 16, 28 (with advances in the main processor triggering advances in the coprocessor).

When the MCR and the LDR instructions reach the execute stages at effectively the same time, the MCR instruction is interpreted by the coprocessor 26 to trigger appropriate debug data to be placed upon the data bus 24. The MCR instruction may be interpreted in a different way when not operating in the debug mode. At the same time, the LDR instruction is interpreted by the main processor 4 to read this debug data from the data bus 24 and store it within the register bank 14.

The main processor 14 then continues to execute a store to memory instruction (STR) that writes the contents of the register containing the debug data back onto the data bus 24 from where they are captured into the output scan chain 22 prior to being scanned out.

In the Annex attached hereto an extract of a document describing debug support is given. This extract deals with interpreted access commands in accordance with one example of the present invention.

Further details of debug operations of integrated circuits in the context of which the present invention may be used can be found in the ARM9TDMI Reference Manual (ARM Document DDI 0145A Chapter 5) which was published in November 1998. Further details of boundary scan systems of a type that may be used with the invention are described in IEEE Standard 1149.1—1990 Standard Test Access Port and Boundary Scan Architecture.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Annex

Debug support

PCLKBS

This is the update clock, generated in the UPDATE-DR state. Typically the value scanned into the chain will be transferred to the cell output on the rising edge of this signal.

ICAPCLKBS, ECAPCLKBS

These are the capture clocks used to sample data into the scan cells during INTEST and EXTEST respectively. These clocks are generated in the CAPTURE-DR state.

SHCLK1BS, SHCLK2BS

These are non-overlapping clocks generated in the SHIFT-DR state that are used to clock the master and slave element of the scan cells respectively. When the state machine is not in the SHIFT-DR state, both these clocks are LOW.

nHIGHZ

This signal can be used to drive the outputs of the scan cells to the high impedance state. This signal is driven LOW when the HIGHZ instruction is loaded into the instruction register, and HIGH at all other times.

In addition to these control outputs, SDINBS output and SDOUTBS input are also provided. When an external scan chain is in use, SDOUTBS should be connected to the serial data output and SDINBS should be connected to the serial data input.

8.6.6 Scan Chains 4 and 15—the ARM920T Memory System

On entry to debug state, the debugger should extract and save the state of CP15. It is advisable that the caches and MMUs are then switched off to prevent any debug accesses to memory from altering their state. At this point, the debugger can non-invasively determine the state of the memory system. When in debug state, the debugger is able to see the state of the ARM920T memory system. This includes:

CP15 caches

MMU

PA tag AM.

Scan chains 15 and 4 are reserved for this use.

Debug Support

Scan Chain 15

This scan chain is 40 bits long, shown below in Table 8-7. With scan chain 15 selected, TDI is connected to bit 39 and TDO is connected to bit 0. An access via this scan chain allows all of CP15's registers to be read and written, the cache CAM and RAM to be read and the TLB CAM and RAM to be read. There are two mechanisms for accesses via scan chain 15, outlined below.

Physical Access

1. In SHIFT-DR, shift in the read/write bit, register address and register value for writing, shown in Table 8-8.
2. Move through UPDATE-DR. For a write, the register will be updated here.
3. For reading, return to SHIFT-DR through CAPTURE-DR and shift out the register value.

Interpreted Access

1. A physical access read-modify-write in C15 (test state) must be done in order to set bit 0, CP15 interpret
2. The required MCR/MRC instruction word is shifted in to scan chain 15.
3. A system-speed LDR(read) or STR(write) is performed on the ARM9TDMI.
4. CP15 will respond to this LDR/STR by executing the coprocessor instruction in its scan chain.
5. In the case of a LDR, the data will be returned to the A3NM9TDMI and can be captured onto scan chain 1 by performing an STR.
6, In the case of an STR, the interpreted MCR will complete with the data that is issued from the ARM9TDMI.
7. A physical access read-modify-write to C15 (test state) must be done in order to clear CP15 interpret, bit 0.

Debug Support

TABLE 8–7

| | Scan chain 15 format and access modes | | | |
|---|---|---|---|---|
| Scan chain bit | Interpreted access | | Physical access | |
| | Function | Read/Write | Function | Read/Write |
| 39 | 0 | Write | nR/W | Write |
| 38:33 | 000000 | Write | Register address | Write |
| 32:1 | Instruction word | Write | Register value | Read/Write |
| 0 | 0 | Write | 1 | Write |

Debug Access to CP15

The mapping of the 6-bit register address field to the CP15 registers for physical access is shown in in Table 8-8.

TABLE 8-8

| Physical access mapping to CP15 registers | | | | | |
|---|---|---|---|---|---|
| Address | | | Register | | |
| [38] | [37:34] | [33] | Number | Name | Type |
| 0 | 0 × 0 | 0 | C0 | ID register | Read |
| 0 | 0 × 0 | 1 | C0 | Cache type | Read |
| 0 | 0 × 1 | 0 | C1 | Control | Read/Write |
| 0 | 0 × 9 | 0 | C9 | Data cache lock-down | Read |
| 0 | 0 × 9 | 1 | C9 | Instruction cache lock-down | Read |
| 0 | 0 × D | 0 | C13 | Process ID | Read/Write |
| 0 | 0 × F | 0 | C15.State | Test state | Read/Write |
| 1 | 0 × D | 1 | C15.C.I.Ind | Instruction cache index | Read |
| 1 | 0 × E | 1 | C15.C.D.Ind | Data cache index | Read |
| 1 | 0 × 1 | 1 | C15.C.1 | Instruction cache | Read/Write |
| 1 | 0 × 2 | 1 | C15.C.D | Data cache | Read/Write |
| 1 | 0 × 5 | 0 | C15.M.I | Instruction MMU | Read |
| 1 | 0 × 6 | 0 | C15.M.D | Data MMU | Read |

The mapping of the 32-bit instruction word field to the remaining CP15 registers for interpreted access is shown in Table 8-9. The construction of a CP15 instruction word from ARM assembler is shown in FIG. 2-1 on page 2–3

TABLE 8-9

Interpreted access mapping to CP15 registers

| ARM920T Instruction | | CP15 Instruction Word | | CP15 Register |
|---|---|---|---|---|
| Write | Read | Write | Read | |
| STR Rd,<Address> | LDR Rd,<Address> | MCR p15,5,r0,c15,c1,2 | MRC p15,5,r0,c15,c1,2 | I TTB |
| STR Rd,<Address> | LDR Rd,<Address> | MCR p15,5,r0,c15,c2,2 | MRC p15,0,r0,c2,c0,0 | D TTB |
| STR Rd,<Address> | LDR Rd,<Address> | MCR p15,5,r0,c15,c1,3 | MRC p15,5,r0,c15,c1,3 | I DAC |
| STR Rd,<Address> | LDR Rd,<Address> | MCR p15,5,r0,c15,c2,3 | MRC p15,0,r0,c3,c0,0 | D DAC |
| STR Rd,<Address> | LDR Rd,<Address> | MCR p15,0,r0,c5,c0,0 | MRC p15,0,r0,c5,c0,0 | FSR |
| STR Rd,<Address> | LDR Rd,<Address> | MCR p15,0,r0,c6,c0,0 | MRC p15,0,r0,c5,c0,0 | FAR |
| STR Rd,<Address> | N/A | MCR p15,0,r0,c9,c1,1 | N/A | ICache lock-down victim |
| STR Rd,<Address> | N/A | MCR p15,0,r0,c9,c1,0 | N/A | DCache lock-down victim |
| STR Rd,<Address> | N/A | MCR p15,0,r0,c9,c0,1 | N/A | ICache lock-down base and victim |
| STR Rd,<Address> | N/A | MCR p15,0,r0,c9,c0,0 | N/A | DCache lock-down base and victim |
| STR Rd,<Address> | LDR Rd,<Address> | MCR p15,0,r0,c10,c0,1 | MRC p15,0,r0,c10,c0,1 | I TLB lock-down |
| STR Rd,<Address> | LDR Rd,<Address> | MCR p15,0,r0,c10,c0,0 | MRC P15,0,r0,c10,c0,0 | D TLB lock-down |

Debug Access to the MMU

This is achieved through scan chain 15, using the interpreted access mechanism. The supported subset of MMU debug operations is shown in Table 8-10. In order to read the instruction or data TLB the following sequence must be taken:

Debug Support

1. Read-modify-write of C1 to turn off both caches and MMU.
2. Read-modify-write of C15. State to set MMU test and CP15 interpret
3. Interpreted LDR. MRC=read C10.
4. STR of value loaded in (3), captured on scan chain 1 and shifted out
5. Interpreted STR, <address>=victim [=0], base [=0]. MRC=write C10.
6. Interpreted 8 word LDM. MCR=CAM read.
7. 8 word STM of values loaded in (6), captured on scan chain 1 and shifted out.
8. Repeat (6) and (7)×8.
9. Interpreted LDR. MCR=RAM1 read
10. Interpreted LDR. MCR=RAM2 read
11. 2 word STM of values loaded in (9) and (10), captured on scan chain 1 and shifted out.
12. Repeat (9), (10) and (11)×64.
13. Interpreted STR, <address>=victim and base [=value saved in (4)]. MCR=write C10.
14. Read-modify-write of C15. State to clear MMU test and CP15 interpret.
15. Write C1 with value read in (1).

TABLE 8-10

Interpreted access mapping to the MMU

| ARM920T Instruction Word | CP15 Instruction Word | MMU Operation |
|---|---|---|
| LDR Rd,<address> or LDMIA Rn,<Rlist> | MCR p15,4,r0,c15,c6,4 | D CAM read |
| LDR Rd,<address> or LDMIA Rn,<Rlist> | MCR p15,4,r0,c15,c10,4 | D RAM1 read |
| LDR Rd,<address> or LDMIA Rn,<Rlist> | MCR p15,4,r0,c15,c2,5 | D RAM2 read |
| LDR Rd,<address> or LDMIA Rn,<Rlist> | MCR p15,4,r0,c15,c5,4 | I CAM read |

TABLE 8-10-continued

Interpreted access mapping to the MMU

| ARM920T Instruction Word | CP15 Instruction Word | MMU Operation |
|---|---|---|
| LDR Rd,<address> or LDMIA Rn,<Rlist> | MCR p15,4,r0,c15,c9,4 | I RAM1 read |
| LDR Rd,<address> or LDMIA Rn,<Rlist> | MCR p15,4,r0,c15,c1,5 | I RAM2 read |

Debug Access to the Caches

This is achieved through scan chain 15, using the interpreted access mechanism. The supported subset of cache debug operations is shown in Table 8-11 on page 8–34. In order to read the instruction or data cache the following sequence must be taken:

1. Read-modify-write of C1 to turn both caches and MMU off and set round-robin mode.
2. Read-modify-write of C15. State to set CP15 interpret.
3. Interpreted LDR, <address>=seg. MCR=CAM read.
4. Read-modify-write of C15. State to clear CP15 interpret
5. Read C15.C.{I/D}.Ind (victim of current segment).
6. Repeat (2)→(5) for each segment.
7. Read-modify-write of C15. State to set CP15 interpret.
8. Interpreted STR, <address>=index [=0], seg. MCR=write C9 victim.
9. Interpreted 8 word LDM, <address>=seg, word [=0]. MCR =RAM read.
10. Interpreted LDR, <address>=seg. MCR=CAM read
11. Read-modify-write to C15. State to clear CP15 interpret
12. 9 word STM of values loaded in (9) and (10), captured on scan chain 1 and shifted out.

Debug Support

14. Repeat (9)→(13)×64.
15. Repeat (8)→(14) for each segment.
16. Interpreted STR, <address>=index [=value read in (5)], seg. MCR=write C9 victim.
17. Repeat (16) for each segment.
18. Read-modify-write to C15. State to clear CP15 interpret.
19. Write the value of C1 read in (1).

TABLE 8-11

Interpreted access mapping to the caches

| ARM920T instruction word | Instruction word | Cache operation |
|---|---|---|
| LDR Rd,<address> or LDMIA Rn,<Rlist> | MCR p15,2,r0,c15,c6,2 | D CAM read |
| LDR Rd,<address> or LDMIA Rn,<Rlist> | MCR p15,2,r0,c15,c10,2 | D RAM read |
| STR Rd,<address> | MCR p15,0,r0,c7,c6,0 | D invalidate all |
| STR Rd,<address> | MCR p15,0,r0,c7,c6,1 | D invalidate single by VA |
| LDR Rd,<address> or LDMIA Rn,<Rlist> | MCR p15,2,r0,c15,c5,2 | I CAM read |
| LDR Rd,<address> or LDMIA Rn,<Rlist> | MCR p15,2,r0,c15,c9,2 | I RAM read |
| STR Rd,<address> | MCR p15,0,r0,c8,c5,0 | I invalidate all |
| STR Rd,<address> | MCR p15,0,r0,c7,c5,1 | I Invalidate single by VA |

We claim:

1. Data processing apparatus responsive to a sequence of processor instructions containing main processor instructions and coprocessor instructions, said data processing apparatus comprising:

(i) a main processor for executing main processor instructions appearing within said sequence of processor instructions;

(ii) a coprocessor coupled to said main processor for executing coprocessor instructions appearing within said sequence of processor instructions; and (iii) an instruction insertion mechanism operative in a debugging mode for supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor.

2. Data processor apparatus as claimed in claim 1, wherein said main processor includes a register bank and said main processor data capture instruction loads said debug data into a register within said register bank.

3. Data processing apparatus as claimed in claim 1, wherein said coprocessor debug data generation instruction operates in said debug mode to trigger said coprocessor to control transfer of state data onto a data bus coupled to said main processor.

4. Data processing apparatus as claimed in claim 1, comprising a cache memory, a coprocessor cache debug data generation instruction triggering said coprocessor to read data contained within said cache memory as said debug data.

5. Data processing apparatus as claimed in claim 4, wherein said cache memory includes a cache RAM storing cached data, a coprocessor cache RAM debug data generation instruction triggering said coprocessor to read cached data contained within said content addressable memory as said debug data.

6. Data processing apparatus as claimed in claim 1, comprising a plurality of coprocessors, one of said coprocessor being a responsive to said coprocessor debug data generation instruction in said debug mode.

7. Data processing apparatus as claimed in claim 1, wherein when not in said debug mode said coprocessor debug data generation instruction has a different function than when in said debug mode.

8. Data processing apparatus responsive to a sequence of processor instructions containing main processor instructions and coprocessor instructions, said data processing apparatus comprising:

(i) a main processor for executing main processor instructions appearing within said sequence of processor instructions;

(ii) a coprocessor coupled to said main processor for executing coprocessor instructions appearing within said sequence of processor instructions; and (iii) an instruction insertion mechanism operative in a debugging mode for supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor, wherein said main processor includes a register bank and said main processor data capture instruction loads said debug data into a register within said register bank, comprising a register store scan chain operative in said debug mode to capture data being read from said register and serially clock said data out of said data processing apparatus.

9. Data processing apparatus, responsive to a sequence of processor instructions containing main processor instructions and coprocessor instructions, said data processing apparatus comprising:

(i) a main processor for executing main processor instructions appearing within said sequence of processor instructions;

(ii) a coprocessor coupled to said main processor for executing coprocessor instructions appearing within said sequence of processor instructions; and (iii) an instruction insertion mechanism operative in a debugging mode for supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor, comprising a cache memory, a coprocessor cache debug data generation instruction triggering said coprocessor to read data contained within said cache memory as said debug data wherein said cache memory includes a content addressable memory storing cache TAG data, a coprocessor cache TAG debug data generation instruction triggering said coprocessor to read TAG data contained within said content addressable memory as said debug data.

10. Data processing apparatus responsive to a sequence of processor instructions containing main processor instructions and coprocessor instructions, said data processing apparatus comprising:

(i) a main processor for executing main processor instructions appearing within said sequence of processor instructions;

(ii) a coprocessor coupled to said main processor for executing coprocessor instructions appearing within said sequence of processor instructions; and (iii) an instruction insertion mechanism operative in a debugging mode for supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor, wherein said coprocessor includes a coprocessor instruction pipeline, said instruction insertion mechanism comprising a coprocessor instruction scan chain operative in said debug mode to serially clock said coprocessor debug data generation instruction into said coprocessor instruction pipeline.

11. Data processing apparatus responsive to a sequence of processor instructions containing main processor instructions and coprocessor instructions, said data processing apparatus comprising:

(i) a main processor for executing main processor instructions appearing within said sequence of processor instructions;

(ii) a coprocessor coupled to said main processor for executing coprocessor instructions appearing within said sequence of processor instructions; and (iii) an instruction insertion mechanism operative in a debugging mode for supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor, wherein said main processor includes a main processor instruction pipeline, said instruction insertion mechanism comprising a main processor instruction scan chain operative in said debug mode to serially clock said main processor data capture instruction into said main processor instruction pipeline.

12. Data processing apparatus responsive to a sequence of processor instructions containing main processor instructions and coprocessor instructions, said data processing apparatus comprising:

(i) a main processor for executing main processor instructions appearing within said sequence of processor instructions;

(ii) a coprocessor coupled to said main processor for executing coprocessor instructions appearing within said sequence of processor instructions; and (iii) an instruction insertion mechanism operative in a debugging mode for supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor, comprising a cache memory, a coprocessor cache debug data generation instruction triggering said coprocessor to read data contained within said cache memory as said debug data, wherein said cache memory includes a victim selection circuit, said victim selection circuit serving in said debug mode to select a cache line from which data is read as said debug data.

13. Data processing apparatus as claimed in claim 12, wherein said victim selection circuit may be configured under processing instruction control to select a specific cache line in said debug mode.

14. Data processing apparatus as claimed in claim 13, wherein said victim selection circuit may be configured under processing instruction control to operate in a round robin mode to select cache line in sequence in said debug mode.

15. Data processing apparatus responsive to a sequence of processor instructions containing main processor instructions and coprocessor instructions, said data processing apparatus comprising:

(i) a main processor for executing main processor instructions appearing within said sequence of processor instructions;

(ii) a coprocessor coupled to said main processor for executing coprocessor instructions appearing within said sequence of processor instructions; and (iii) an instruction insertion mechanism operative in a debugging mode for supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor, comprising a memory management unit, a coprocessor MMU debug data generation instruction triggering said memory management unit to read access control data contained within said memory management unit as said debug data.

16. A data processing method controlled by a sequence of processor instructions containing main processor instructions and coprocessor instructions, said data processing method comprising the steps of:

(i) executing with a main processor main processor instructions appearing within said sequence of processor instructions;

(ii) executing with a coprocessor coprocessor instructions appearing within said sequence of processor instructions; and (iii) in a debugging mode, supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor.

17. A data processing method controlled by a sequence of processor instructions containing main processor instructions and coprocessor instructions, said data processing method comprising the steps of:

(i) executing with a main processor main processor instructions appearing within said sequence of processor instructions;

(ii) executing with a coprocessor coprocessor instructions appearing within said sequence of processor instructions; and (iii) in a debugging mode, supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor;

wherein said main processor includes a register bank, a main processor data capture instruction loading said debug data into a register within said register bank, and a register store scan chain, operative in said debug mode, capturing data being read from said register and serially clocking said data out.

18. A data processing method controlled by a sequence of processor instructions containing main processor instructions and coprocessor instructions, said data processing method comprising the steps of:

(i) executing with a main processor main processor instructions appearing within said sequence of processor instructions;

(ii) executing with a coprocessor coprocessor instructions appearing within said sequence of processor instructions; and (iii) in a debugging mode, supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor;

further comprising a cache memory, a coprocessor cache debug data generation instruction triggering said coprocessor to read data contained within said cache memory as said debug data, wherein said cache memory includes a content addressable memory storing cache TAG data, a coprocessor c ache TAG debug data generation instruction triggering said coprocessor to read TAG data contained within said content addressable memory as said debug data.

19. A data processing method controlled by a sequence of processor instructions containing main processor instructions and coprocessor instructions, said data processing method comprising the steps of:

(i) executing with a main processor main processor instructions appearing within said sequence of processor instructions;

(ii) executing with a coprocessor coprocessor instructions appearing within said sequence of processor instructions; and (iii) in a debugging mode, supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor;

wherein said coprocessor includes a coprocessor instruction pipeline, a coprocessor instruction scan chain, operative in said debug mode, serially clocking said coprocessor debug data generation instruction into said coprocessor instruction pipeline.

20. A data processing method controlled by a sequence of processor instructions containing main processor instructions and coprocessor instructions, said data processing method comprising the steps of:

(i) executing with a main processor main processor instructions appearing within said sequence of processor instructions;

(ii) executing with a coprocessor coprocessor instructions appearing within said sequence of processor instructions; and (iii) in a debugging mode, supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor;

wherein said main processor includes a main processor instruction pipeline, a main processor instruction scan chain, operative in said debug mode, serially clocking said main processor data capture instruction into said main processor instruction pipeline.

21. A data processing method controlled by a sequence of processor instructions containing main processor instructions and coprocessor instructions, said data processing method comprising the steps of:

(i) executing with a main processor main processor instructions appearing within said sequence of processor instructions;

(ii) executing with a coprocessor coprocessor instructions appearing within said sequence of processor instructions; and (iii) in a debugging mode, supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor;

further including a cache memory, said coprocessor, responsive to a coprocessor cache debug data generation instruction, reading data contained within said cache memory as said debug data, wherein said cache memory includes a victim selection circuit, said victim selection circuit selecting, in said debug mode, a cache line from which data is read as said debug data.

22. Data processing method as claimed in claim 21, wherein said victim selection circuit, under processing instruction control, selecting a specific cache line in said debug mode.

23. Data processing method as claimed in claim 22, wherein said victim selection circuit, under processing instruction control, operating in a round robin mode to select cache line in sequence in said debug mode.

24. A data processing method controlled by a sequence of processor instructions containing main processor instructions and coprocessor instructions, said data processing method comprising the steps of:

(i) executing with a main processor main processor instructions appearing within said sequence of processor instructions;

(ii) executing with a coprocessor coprocessor instructions appearing within said sequence of processor instructions; and (iii) in a debugging mode, supplying different processor instructions to said main processor and said coprocessor such that said main processor executes a main processor data capture instruction whilst said coprocessor executes a coprocessor debug data generation instruction whereby debug data is generated under control of said coprocessor and said debug data is captured by said main processor; and further comprising a memory management unit, and triggering said memory management unit, with a coprocessor MMU debug data generation instruction, to read access control data contained within said memory management unit as said debug data.

* * * * *